United States Patent
Zehler

(10) Patent No.: US 8,896,858 B2
(45) Date of Patent: Nov. 25, 2014

(54) METHOD FOR ENFORCING DOCUMENT PRIVACY THROUGH THIRD PARTY SYSTEMS

(75) Inventor: Peter Zehler, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 172 days.

(21) Appl. No.: 13/555,153

(22) Filed: Jul. 22, 2012

(65) Prior Publication Data

US 2014/0022586 A1 Jan. 23, 2014

(51) Int. Cl.
- *G06K 15/00* (2006.01)
- *G06F 3/12* (2006.01)
- *H04N 1/44* (2006.01)

(52) U.S. Cl.
CPC .............. *G06K 15/00* (2013.01); *H04N 1/4413* (2013.01)
USPC ....... 358/1.14; 358/1.15; 358/1.16; 358/1.17; 358/1.13

(58) Field of Classification Search
None
See application file for complete search history.

(56) References Cited

U.S. PATENT DOCUMENTS

| | | | |
|---|---|---|---|
| 5,633,932 A | 5/1997 | Davis et al. | |
| 6,378,070 B1 | 4/2002 | Chan et al. | |
| 6,711,677 B1 | 3/2004 | Wiegley | |
| 7,010,144 B1 * | 3/2006 | Davis et al. | 382/100 |
| 7,080,041 B2 * | 7/2006 | Nagel | 705/51 |
| 7,152,047 B1 * | 12/2006 | Nagel | 705/76 |
| 7,181,017 B1 | 2/2007 | Nagel et al. | |
| 7,209,571 B2 * | 4/2007 | Davis et al. | 382/100 |
| 7,401,352 B2 | 7/2008 | Duri et al. | |
| 7,450,260 B2 * | 11/2008 | Takeda et al. | 358/1.15 |
| 7,562,223 B2 * | 7/2009 | Ragnet et al. | 713/171 |
| 7,734,093 B2 * | 6/2010 | Wolff et al. | 382/183 |
| 8,082,446 B1 * | 12/2011 | Carroll | 713/176 |
| 2002/0053024 A1 * | 5/2002 | Hashimoto et al. | 713/168 |
| 2004/0054906 A1 * | 3/2004 | Carro | 713/171 |
| 2008/0170696 A1 * | 7/2008 | Yoshimura et al. | 380/277 |
| 2012/0191976 A1 * | 7/2012 | Blot-Lefevre | 713/168 |
| 2012/0317414 A1 * | 12/2012 | Glover | 713/165 |
| 2013/0254536 A1 * | 9/2013 | Glover | 713/165 |

\* cited by examiner

*Primary Examiner* — Satwant Singh
(74) *Attorney, Agent, or Firm* — Novel IP

(57) ABSTRACT

The application discloses systems and methods for securing a document while routing through native or third party infrastructure. A process resident on the user's platform generates a three-part secure document from the user's original document. The first part is public and contains document metadata such as a public key. The public key is used to encrypt the second part of the document's metadata which includes a user supplied password. The third part contains the original document that has been symmetrically encrypted using the user supplied password. The result is that only the first part of the new document is visible to unsecured transmission channels or third party infrastructure.

22 Claims, 4 Drawing Sheets

US 8,896,858 B2

METHOD FOR ENFORCING DOCUMENT PRIVACY THROUGH THIRD PARTY SYSTEMS

FIELD

The present application relates generally to secure data transmission. More particularly, the present application relates to a method for securing documents when using document services remotely via third party systems.

BACKGROUND

Traditionally, users of document management systems and multi-function devices (MFDs) communicated with the target service directly. The advent of distributed computer systems made it possible for users to print remotely on a network printer. Printers, given appropriate interfaces, could be arranged to connect directly to the network of a distributed system. Remote access to a target service has become even more necessary in today's mobile and network environment. Since these devices have limited functionality in terms of printing and other document services, they often rely on "cloud technologies" in which a user accesses an electronic service, such as data storage or printing, provided by a third party infrastructure vendor via a network accessible interface. Because access to the target service is through infrastructure owned or controlled by an entity other than the data owner, maintaining the privacy and confidentiality of data becomes an important concern for the user of these cloud services.

While communication over a secure channel ensures privacy between the user's client device and the third party infrastructure, it does not protect the user's document when it is in the third party's infrastructure. Consequently, a user can only be confident that his or her data is protected while in transit to the cloud service, but not when the service is actually acting on the data, i.e. printing the data.

Configuration complexities arise when a third party's infrastructure is used to connect a user to a document service. For example, to use conventional data securing techniques, the user and document service must share a password in order to encrypt and decrypt the document data. However, since the third party infrastructure mediates any interaction between the user and the document service, the identity of the user may be unknown to the document service. However, it is typically required that an association between the user and document service be maintained regardless of the technologies used within the third party infrastructure. Examples of these technologies include network file systems, distributed queues or cloud based services.

Accordingly, there is a need for systems and methods that enable secure document exchanges between users' client devices and third party document services, such as document management systems, printers, multifunction devices, publication services, among other services. Such systems would preferably enable users to remotely print sensitive documents without allowing any third party, even the party through whose infrastructure the data is routed and processed, to actually intelligibly view the data transferred between the local computer and remote printer.

SUMMARY

The aforementioned and other embodiments of the present shall be described in greater depth in the drawings and detailed description provided below. In one embodiment, the present application discloses an apparatus for generating a secured electronic document, wherein said apparatus comprises a non-volatile computer readable medium storing a plurality of programmatic instructions, wherein said programmatic instructions, when executed by a processor, generate the secured electronic document by: a) receiving an unprotected document comprising content; b) receiving a public key specific to a document service; c) generating a first portion of said secured electronic document, wherein said first portion comprises said public key; d) generating a second document portion of said secured electronic document, wherein said second document portion comprises a password and wherein the second document portion is encrypted using said public key; e) generating a third document portion of said secured electronic document, wherein said third document portion comprises the content of the unprotected document wherein said third document portion is protected using said password; and f) forming said secured document using said first document portion, second document portion, and third document portion.

Optionally, the first portion further comprises routing information, wherein said routing information details a network location of said document service. The network location is designated by a network address, a universally unique identifier (UUID), or a service name. The apparatus further comprises prompting a user for a password and receiving an input indicative of said password. The public key corresponds to a private key specific to said document service. Neither the first document portion nor the third document portion is encrypted using a public or private key. The second document portion comprises at least one of a job ticket, document name, document ownership details, account information, financial information, financial transaction data, credit card data, access control lists, storage repository information, client data, confidentiality designations, time of creation, place of creation, or version number. The public key is received directly from said document service. The apparatus further comprises transmitting the secured document to the document service through an unsecured transmission channel.

In another embodiment, the present specification discloses a system for generating and processing a secured electronic document, wherein said system comprises a first non-volatile computer readable medium storing a plurality of programmatic instructions, wherein said programmatic instructions, when executed by a processor, generate the secured electronic document by: a) receiving a public key specific to a document service; b) generating a first portion of said secured electronic document, wherein said first portion comprises said public key; c) generating a second document portion of said secured electronic document, wherein said second document portion comprises a password and wherein the second document portion is encrypted using said public key; d) generating a third document portion of said secured electronic document, wherein said third document portion comprises content of the unprotected document wherein said third document portion is protected using said password; e) forming said secured electronic document using said first document portion, second document portion, and third document portion; f) transmitting said secured electronic document. The system further comprises a second non-volatile computer readable medium storing a plurality of programmatic instructions, wherein said programmatic instructions, when executed by a processor, process said secured electronic document by: a) generating and transmitting the public key to the first non-volatile computer readable medium; b) receiving the secured document from the first non-volatile computer readable medium; c) acquiring the public key from the first portion of said secured electronic document; d) decrypting the second portion of the secured electronic document using a private key corresponding to said public key; e) acquiring the password from the second portion of said secured electronic document; and f) unlocking the third portion of said secured electronic document using said password.

Optionally, the first portion further comprises routing information, wherein said routing information details a network location of said document service. Neither the first document portion nor the third document portion is encrypted using a public or private key. The second document portion comprises at least one of a job ticket, document name, document ownership details, account information, financial information, financial transaction data, credit card data, access control lists, storage repository information, client data, confidentiality designations, time of creation, place of creation, or version number. The second non-volatile computer readable medium is associated with the document service and wherein said document service processes the secured electronic document using at least one of a job ticket, document name, document ownership details, account information, financial information, financial transaction data, credit card data, access control lists, storage repository information, client data, confidentiality designations, time of creation, place of creation, or version number. The document service is at least one of a document repository service or printing service. The public key is transmitted directly from second non-volatile computer readable medium to said first non-volatile computer readable medium. The secured electronic document is transmitted through, and received from, an unsecured transmission channel.

In another embodiment, the present specification discloses a method for generating and processing a secured electronic document, wherein said method is implemented using non-volatile computer readable mediums that store a plurality of programmatic instructions, wherein said programmatic instructions, when executed by processors, generate the secured electronic document and wherein said method comprises: a) receiving a public key specific to a document service; b) generating a first portion of said secured electronic document, wherein said first portion comprises said public key; c) generating a second document portion of said secured electronic document, wherein said second document portion comprises a password and wherein the second document portion is encrypted using said public key; d) generating a third document portion of said secured electronic document, wherein said third document portion comprises content of the unprotected document wherein said third document portion is protected using said password; e) forming said secured document using said first document portion, second document portion, and third document portion; and f) transmitting said secured electronic document to the document service.

Optionally, the first non-volatile computer readable medium is part of a first computing device and first computing device is adapted to access a document service across a network connection. The second non-volatile computer readable medium is part of a second computing device and the second computing device is adapted to provide a document service across a network connection, and wherein said document service is at least one of a document repository, printing, scanning, facsimile, bookmaking, document management, or optical character recognition.

Optionally, the method further comprises generating and transmitting the public key; receiving the secured electronic document; acquiring the public key from the first portion of said secured electronic document; decrypting the second portion of the secured electronic document using a private key corresponding to said public key; acquiring the password from the second portion of said secured electronic document; and unlocking the third portion of said secured electronic document using said password. Neither the first document portion nor the third document portion is encrypted using a public or private key.

BRIEF DESCRIPTION OF THE DRAWINGS

These and other features and advantages will be appreciated as they become better understood by reference to the following Detailed Description when considered in connection with the accompanying drawings, wherein.

DETAILED DESCRIPTION

The present application discloses multiple embodiments. The following disclosure is provided in order to enable a person having ordinary skill in the art to practice the claimed inventions. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present application is to be accorded the widest scope encompassing numerous alternatives, modifications and equivalents consistent with the principles and features disclosed. For purpose of clarity, details relating to technical material that is known in the technical fields related to the claimed inventions have not been described in detail so as not to unnecessarily obscure the disclosure.

In one embodiment, the present application discloses a method for maintaining end to end privacy between the user and a document service even while permitting a wide range of submission paths through native and third party infrastructure. The application provides a convenient and trusted method for user registration with the target service and a means to encode a document prior to submission.

The term "document service," as used herein, broadly encompasses any hardware implementing software programs that process the contents of documents, which is an electronic file in any of a plurality of formats including, but not limited to, .doc, .xls, .pdf, .ppt, among other variations and formats. Exemplary document services include, but are not limited to, document repositories, printers, scanning machines, facsimile machines, bookmaking machines, or multifunction machines, document management systems, and OCR services. Document services may be accessed over a wired or wireless network by a user's computing device such as a computer, laptop, PDA, smartphone or tablet.

The term "unprotected document", as used herein, is a document whose contents may be accessed by any entity in possession of the document. Conversely, the term "protected document", as used herein, is a document whose contents may only be accessed entities having permission, authority, an ability to decrypt, or an ability to unlock the document. The term "unsecured transmission channel", as used herein, is a communication medium that may be accessed or used by entities who are not authorized to view the contents of a protected document.

Figure 1:
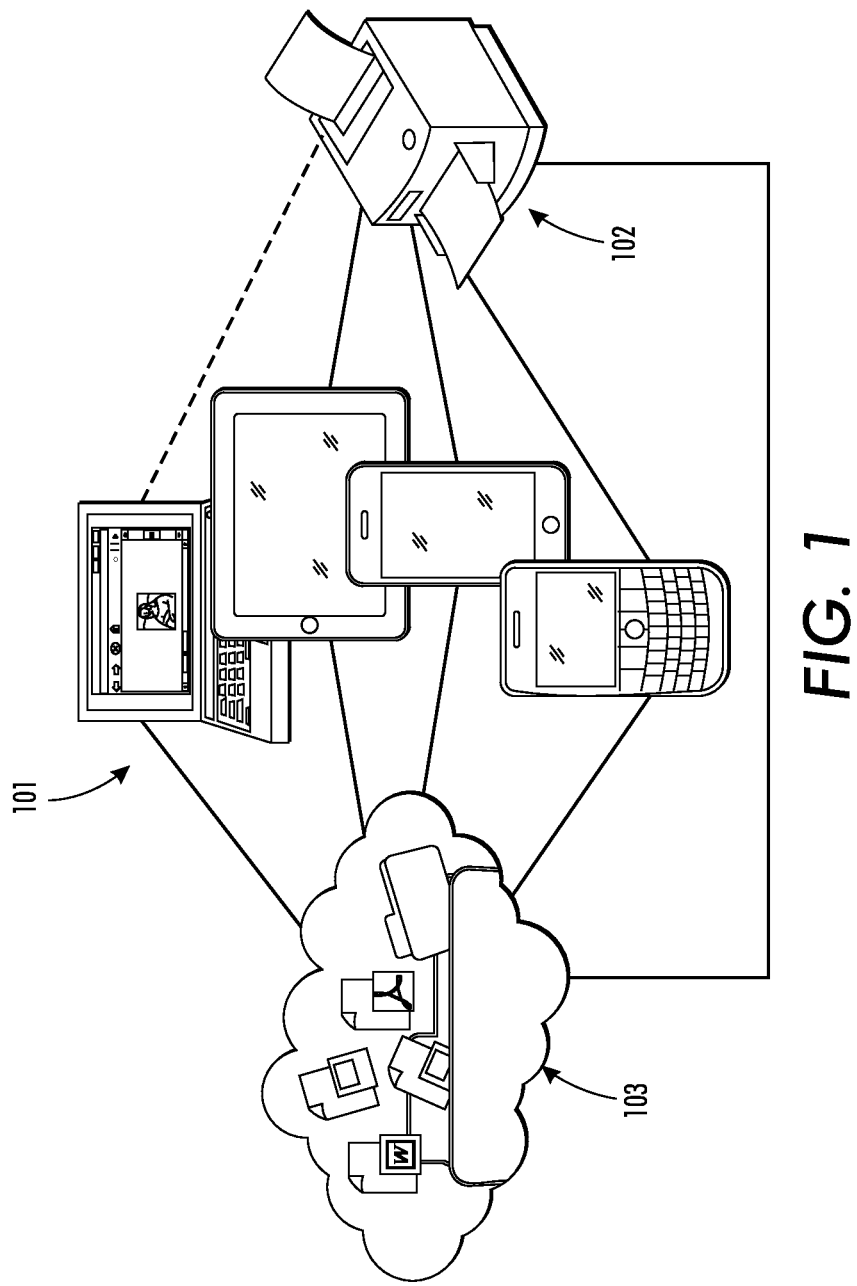
FIG. 1 an exemplary network environment wherein a user device accesses a document service.

FIG. 1 illustrates an exemplary network environment where a user's computing device accesses a document service. Referring to FIG. 1, the user's computing device 101 may comprise a smartphone, laptop, tablet, a notebook or any other computing device. In this example, the target service that the user desires to access using his/her computing device is provided by a multi-function device (MFD) 102 and may include printing and/or faxing. The user may access the target service by using native infrastructure, which involves the user device being connected by means of a wired or wireless connection, directly or by means of a distributed network, to the MFD 102. Alternatively, the user device may use a third party infrastructure 103, such as a cloud service, to communicate with the MFD 102. Thus, for example, using a cloud service would allow the user device 101 to submit a print job to the cloud, from where the job is routed to one of a plurality of network-accessible printers to generate a physical copy. The target printer is may be specified by the user device when submitting a print job or it may be chosen by the cloud service based on printer availability.

Figure 2:
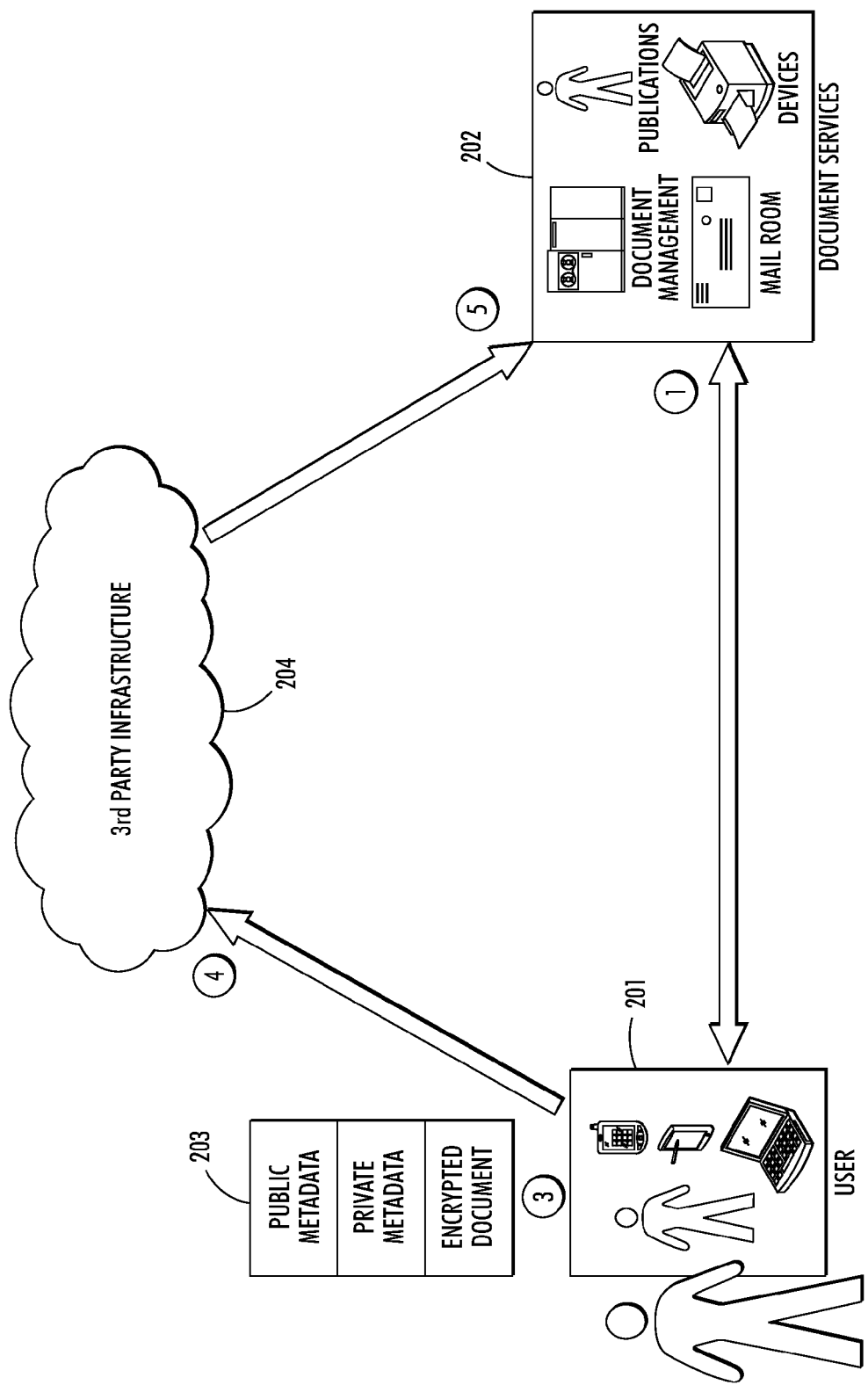
FIG. 2 illustrates a system according to one embodiment, in which a document is securely transmitted between a user device and a target document service.

FIG. 2 illustrates a system according to one embodiment, in which a print job or any other document is securely transmitted between a user device and a target document service, even when routed through third party infrastructure. Referring to FIG. 2, user 201 comprises a smartphone, laptop, tablet, a notebook or any other computing device. In order to access and use a desired document service, the user device 201 logs on to the target Document Service (DS) system 202. One of ordinary skill in the art would appreciate that document service may comprise any system or service that can change, process or interpret document content, such as, but not limited to multifunction devices, mail services, Document Management Systems, document publication services, etc. Logging into a desired Document Service may involve authentication. In one embodiment, logging in comprises rigorous authentication validated against a back end directory service. In another embodiment, an anonymous user may simply approach and register directly with an MFD for the desired service. In yet another embodiment, the document service may authenticate the user using a standard login and password process or any other known authentication system.

After the user logs in and authenticates himself, the target Document Service 202 securely provides a public key to the user or an agent running on the user's device 201. A public key is a cryptographic key that can be obtained and used by anyone to encrypt messages intended for the target Document Service 202. The public key may be specific to the service requested by the user, or, in case of MFDs, it can be a key associated with the device. Regardless, the key is specific to the document service, and not a third party IT infrastructure, which may or may not participate in the distribution of the public key. Preferably, however, the present system requires no infrastructure for key exchange—the public key is supplied directly by the document service to the user, thereby avoiding any ambiguity about who, in fact, is the trusted entity, which might arise in security systems which rely on obtaining information about an object from an entity other than the object itself The present system also allows the target document services to flexibly determine the manner in which the public key is generated or distributed. For example, the public key could be the public key of the Document Service itself or the Document Service could generate a key pair for each User. In one embodiment, if the document service is a printer or other multi-function device (MFD), it freely distributes a public key to any person who is physically present at the printer. That is, the MFD is allowed to assume that the person physically present at the device is authorized to access the device. In another embodiment, public keys may be distributed to any individual authorized to access, i.e. able to pass a standard authentication procedure, a particular service or group of services. In another embodiment, public keys may only be distributed to users authenticated to use a particular service and not other services.

Thus for example, a document repository service, provided within a larger document management system, can distribute a user-specific public key, which would permit only a specific user to access the content of the document stored in the repository but not permit that user to print to a printer associated with that document management system. Similarly, a document printing service, provided within a larger document management system, can distribute a user-specific public key, which would permit only a specific user to access and use a printer associated with that document management system but not permit that user to store any documents within a document repository service associated with that document management system.

Preferably, the public key is delivered to the user 201 via a trusted channel. In one embodiment, the user device 201 is physically connected to the document service 202. In another embodiment, if the document service is a printer, a page is printed that contains the encoded public key. Further, a User device capable of taking a picture can acquire the encoded public key. In another embodiment, the public key could be delivered via a secure network connection, such as a virtual private network (VPN) or other secured channels.

When the document service 202 creates a public key, it also creates a corresponding private key. The private key is kept secret by the document service 202 and is used by the document service to decrypt data that has been encrypted with the corresponding public key. This is conventional key pair creating process, which is well known in the art, will not be described further herein.

Figure 4:
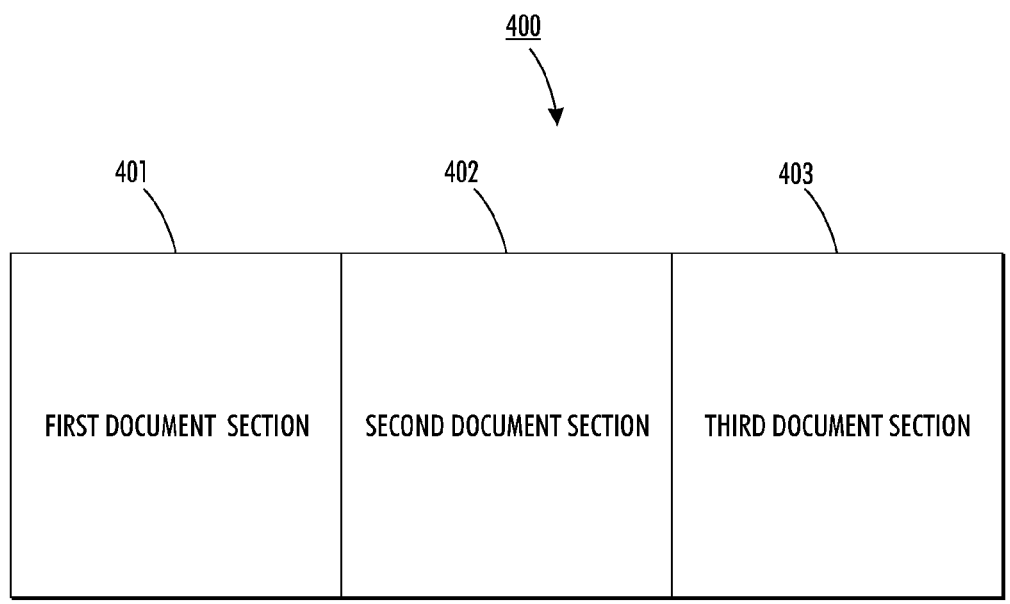
FIG. 4 is an exemplary structure of a secured document.

After receiving the public key created and distributed by the document service 202, an agent or application running on the user device 201 uses the public key to create a private and secure document 203. In one embodiment, referring to FIG. 4, the secure document 400 comprises three sections, 401, 402, and 403.

The first section, 401, comprises publicly accessible and readable metadata in clear text. This section includes the document service's 202 public key. It further includes some identifier, such as a qualified name or the network address for the document service 202, or universally unique identifier (UUID) of the target document service 202. The first section thus serves to fully describe the document, and its intended destination, to enable a cloud service to properly route the document to the right intended destination, namely the target document service.

The second section, 402, of the secure document 400 comprises private metadata that is encrypted using the public key. Private metadata from this section includes data necessary for the processing of the document. In one embodiment, private metadata includes job ticket with the name of document and ownership details, account and financial information such as any payment made for document processing, financial transaction data, credit card information, access control lists detailing which users have access to the document, storage repository information, client details, confidentiality designations, time of creation, place of creation, version number, among other details. The private metadata section also contains a user selected password that is used to encrypt the user's document that is to be sent to the document service 202. Any other metadata that the user or the document service would like to keep private is also included in this section.

The third section, 403, of the secure document 400 comprises the user's actual document which has been encrypted using the user selected password. The password, as stated above, is only made known to the document service capable of decrypting the second section 402.

One of ordinary skill in the art would appreciate that the metadata in the second section of the document is small and carries information in just a few bytes. Therefore, even though the public/private key process is computationally expensive, it can be easily used to encrypt the private metadata section without requiring large amounts of processing. As a result, large amounts of data (third sections) may be protected in a computationally inexpensive manner, namely by using a password, while the data required to unlock the protected third sections are secured in a computationally expensive manner, namely by using public-private key encryption. One of ordinary skill in the art would also appreciate that the use of first, second and third section is not intended to provide any physical or logical ordering of the data, but rather, just designations to differentiate between each of the individual data portions of the secure document 400.

Having password protected the data contents and encrypted the password itself but made available the routing information, the user can then make use of unsecured, native and/or third party infrastructure 204 for transmitting the secure and private document to the desired document service 202.

Once the document is received by the right document service 202, as per the identifying information embedded in the first section of the document, the target document service 202 uses the public key to find the corresponding private key pair, which only that document service 202 possesses. Using the corresponding private key, the document service 202 can decrypt the second section of the document. Thus, the system ensures that only the target document service 202 will be able to decrypt the private metadata section.

As mentioned above, the private metadata also includes a user selected password. The third and final section, the secure document 203, is encrypted using the user selected password, and it contains the actual document content. Thus, once the second part metadata is decrypted, the document service 202 retrieves the user selected password and uses it to gain access to, or unlock, the third section, which is the document itself. The document service 202 uses the other metadata of the second section to process the document.

One advantage of the present system over existing techniques of securing data is that the secure document generated by the present system is self-describing. No information associated with a secure connection or document ownership is required to decrypt the document. The document is private until acted upon by the target document service 202, and only the user or the target document service 202, or their agents, can decrypt the user's document.

With the first part of the document, a routing service can effectively route the document to the appropriate service without the possibility of the document content being subject to mining. Document contents cannot be intercepted even when routed through third party infrastructure, since the document metadata is encrypted with the public key and the document body is protected by the user's password.

The present system does not employ the conventional approach of encrypting the entire document using the public/private key pair. This is because this approach is computationally expensive, and would require large amounts of resources when encrypting a huge document that runs into megabyte or gigabyte range. Rather, the present approach encrypts the small amount of metadata contained in the second section of the document and then allows use of a user selected password to unlock access to the third part, which is the actual document. Thus, it may be noted that the second part of the document is encrypted, while the third part of the document is merely "password protected". In this manner, the present approach provides two different levels of security, the second section being more secure than the third section, while minimizing the computational cost at the same time.

Figure 3:
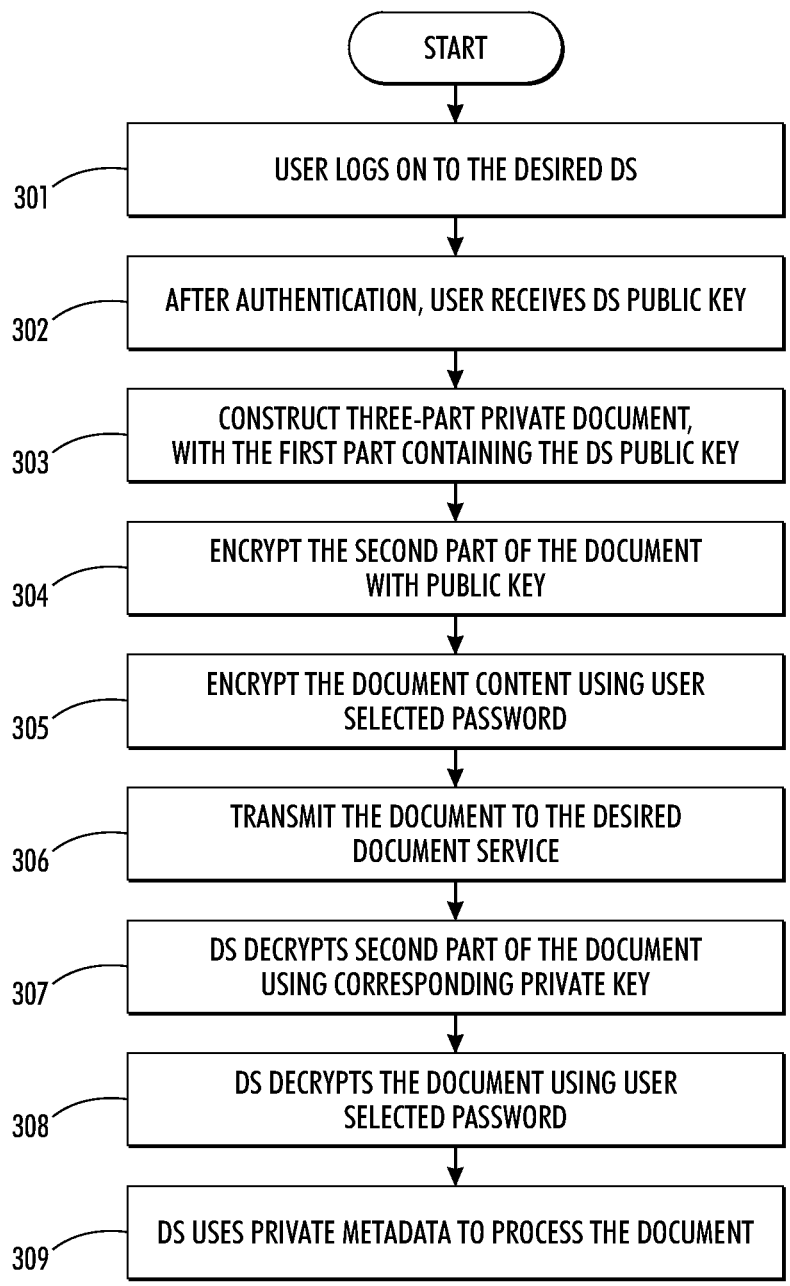
FIG. 3 is a flowchart illustrating an exemplary method for generating and transmitting a secure document, according to one embodiment.

FIG. 3 is a flowchart illustrating the process of generating of a secure, private document and securely transmitting it to the target document service. Referring to FIG. 3, the user logs on 301 to the desired document service 202. After authentication, the document service's public key is securely delivered to the user or agent running on the user's device 302. The user's device constructs 303 a private document, having at least three parts, with the first part containing the document service's public key. The public key is used to encrypt the second part of the document, containing private metadata, 304. At some point in the process, the user's device prompts the user for a password, receives a response from the user, includes the inputted password in the second part of the document, and uses the password to lock the user's document 305. The password protected document content forms the third part of the private document.

The user device transmits 306 the secured document through unsecure, native and/or third party infrastructure to the desired document service. On receiving the secure document, the document service uses the public key contained in the first part to obtain the corresponding private key and decrypts 307 the second part of the private document. From the now-decrypted second part, the document service then obtains the user selected password and uses it to decrypt 308 the document content. Private metadata from the second part of the secure document is used by the document service to process the document 309.

It should be appreciated that process steps described herein taking place on the user's client device and document service are performed by a plurality of programmatic instructions, which are stored in non-volatile mediums that are either remote from or local to the respective client device or hardware responsible for performing the document service, i.e. server, multi-function device, or other system and executed by one or more processors. It should further be appreciated that any of the data transmissions described herein can be performed via wired or wireless communications.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

I claim:

1. An apparatus for generating a secured electronic document, wherein said apparatus comprises a non-volatile computer readable medium storing a plurality of programmatic instructions, wherein said programmatic instructions, when executed by a processor, generate the secured electronic document by:

receiving an unprotected document comprising content;

receiving a public key specific to a document service;

generating a first portion of said secured electronic document, wherein said first portion comprises said public key;

generating a second document portion of said secured electronic document, wherein said second document portion comprises a password and wherein the second document portion is encrypted using said public key;

generating a third document portion of said secured electronic document, wherein said third document portion comprises the content of the unprotected document wherein said third document portion is protected using said password; and forming said secured document using said first document portion, second document portion, and third document portion, thereby creating the secured electronic document having the public key, the password, and the content incorporated therein.

2. The apparatus of claim 1 wherein said first portion further comprises routing information, wherein said routing information details a network location of said document service.

3. The apparatus of claim 2 wherein said network location is designated by a network address, a universally unique identifier (UUID), or a service name.

4. The apparatus of claim 1 further comprising prompting a user for a password and receiving an input indicative of said password.

5. The apparatus of claim 1 wherein said public key corresponds to a private key specific to said document service.

6. The apparatus of claim 1 wherein neither the first document portion nor the third document portion is encrypted using a public or private key.

7. The apparatus of claim 1 wherein said second document portion comprises at least one of a job ticket, document name, document ownership details, account information, financial information, financial transaction data, credit card data, access control lists, storage repository information, client data, confidentiality designations, time of creation, place of creation, or version number.

8. The apparatus of claim 1 wherein said public key is received directly from said document service.

9. The apparatus of claim 1 further comprising transmitting the secured document to the document service through an unsecured transmission channel.

10. A system for generating and processing a secured electronic document, wherein said system comprises:

a first non-volatile computer readable medium storing a plurality of programmatic instructions, wherein said programmatic instructions, when executed by a processor, generate the secured electronic document by:

receiving a public key specific to a document service;

generating a first portion of said secured electronic document, wherein said first portion comprises said public key;

generating a second document portion of said secured electronic document, wherein said second document portion comprises a password and wherein the second document portion is encrypted using said public key;

generating a third document portion of said secured electronic document, wherein said third document portion comprises content of the unprotected document wherein said third document portion is protected using said password;

forming said secured electronic document using said first document portion, second document portion, and third document portion, thereby creating the secured electronic document having the public key, the password, and the content incorporated therein;

transmitting said secured electronic document;

a second non-volatile computer readable medium storing a plurality of programmatic instructions, wherein said programmatic instructions, when executed by a processor, process said secured electronic document by:

generating and transmitting the public key to the first non-volatile computer readable medium;

receiving the secured document from the first non-volatile computer readable medium;

acquiring the public key from the first portion of said secured electronic document;

decrypting the second portion of the secured electronic document using a private key corresponding to said public key;

acquiring the password from the second portion of said secured electronic document; and unlocking the third portion of said secured electronic document using said password.

11. The system of claim 10 wherein said first portion further comprises routing information, wherein said routing information details a network location of said document service.

12. The system of claim 10 wherein neither the first document portion nor the third document portion is encrypted using a public or private key.

13. The system of claim 10 wherein said second document portion comprises at least one of a job ticket, document name, document ownership details, account information, financial information, financial transaction data, credit card data, access control lists, storage repository information, client data, confidentiality designations, time of creation, place of creation, or version number.

14. The system of claim 10 wherein second non-volatile computer readable medium is associated with the document service and wherein said document service processes the secured electronic document using at least one of a job ticket, document name, document ownership details, account information, financial information, financial transaction data, credit card data, access control lists, storage repository information, client data, confidentiality designations, time of creation, place of creation, or version number.

15. The system of claim 14 wherein the document service is at least one of a document repository service or printing service.

16. The system of claim 10 wherein said public key is transmitted directly from second non-volatile computer readable medium to said first non-volatile computer readable medium.

17. The system of claim 10 wherein said secured electronic document is transmitted through, and received from, an unsecured transmission channel.

18. The system of claim 10 wherein the first non-volatile computer readable medium is part of a first computing device and wherein said first computing device is adapted to access a document service across a network connection.

19. The system of claim 18 wherein the second non-volatile computer readable medium is part of a second computing device and wherein said second computing device is adapted to provide a document service across a network connection, and wherein said document service is at least one of a document repository, printing, scanning, facsimile, bookmaking, document management, or optical character recognition.

20. A method for generating and processing a secured electronic document, wherein said method is implemented using non-volatile computer readable mediums that store a plurality of programmatic instructions, wherein said programmatic instructions, when executed by processors, generate the secured electronic document and wherein said method comprises:

receiving a public key specific to a document service;

generating a first portion of said secured electronic document, wherein said first portion comprises said public key;

generating a second document portion of said secured electronic document, wherein said second document portion comprises a password and wherein the second document portion is encrypted using said public key;

generating a third document portion of said secured electronic document, wherein said third document portion comprises content of the unprotected document wherein said third document portion is protected using said password;

forming said secured document using said first document portion, second document portion, and third document portion, thereby creating the secured electronic document having the public key, the password, and the content incorporated therein; and transmitting said secured electronic document to the document service.

21. The method of claim 20 further comprising generating and transmitting the public key;

receiving the secured electronic document;

acquiring the public key from the first portion of said secured electronic document;

decrypting the second portion of the secured electronic document using a private key corresponding to said public key;

acquiring the password from the second portion of said secured electronic document; and unlocking the third portion of said secured electronic document using said password.

22. The method of claim 20 wherein neither the first document portion nor the third document portion is encrypted using a public or private key.

* * * * *